United States Patent [19]

Peterson

[11] Patent Number: 4,936,289
[45] Date of Patent: Jun. 26, 1990

[54] USAGE RESPONSIVE HOT WATER RECIRCULATION SYSTEM

[76] Inventor: George A. Peterson, Star Rt. Box 57 Overlook, Bolinas, Calif. 94924

[21] Appl. No.: 313,543

[22] Filed: Feb. 21, 1989

[51] Int. Cl.$^5$ .............................................. F24H 1/00
[52] U.S. Cl. .................................. 126/362; 417/300; 219/309
[58] Field of Search ................. 126/362; 137/563; 417/300, 43; 219/297, 309

[56] References Cited

U.S. PATENT DOCUMENTS

| | | | |
|---|---|---|---|
| 3,575,157 | 4/1971 | Whittel | 126/362 |
| 4,142,515 | 3/1979 | Skaats | 126/362 |
| 4,201,518 | 5/1980 | Stevenson | |
| 4,498,622 | 2/1985 | Harnish | 126/362 |
| 4,606,325 | 8/1986 | Lujan, Jr. | 126/362 |

Primary Examiner—Carroll B. Dority

[57] ABSTRACT

An energy conservation apparatus for controlling the operation of a recirculating hot water distribution system which comprises of a hot water heater (15) having an outlet (17) and an inlet (16); a return pipe (24) interconnecting the end of the supply pipe back to a tee (25) on the makeup water inlet to form a loop; and an electrically operated recirculating pump (26) in the loop, usually on the return pipe, that circulates the hot water around the loop. Thus hot water is available anywhere in the system without having to first discharge any cooled hot water that has been standing in the piping. The invention consists of a sensitive flow sensor or usage detection device (33) located on the unheated makeup water supply and connected to a controller (34). The controller turns on the recirculating pump only when hot water is draw from any of the usage points. The invention saves energy by reducing the heat loss from the hot water distribution system. Options are available to prevent false activation due to system leakage, to prevent activation on very short usages, to turn off or prevent the activation of the system if the distribution system is already hot, to run the pump for a preset minimum time and/or to monitor leakage or sensor problems in the system.

19 Claims, 11 Drawing Sheets

USAGE RESPONSIVE HOT WATER RECIRCULATION SYSTEM

BACKGROUND

1. Field of the Invention

This invention is in the field of hot water fluid recirculation systems, specifically, to an energy saving recirculation system.

2. Description of the Problem Area

In large buildings, such as apartment buildings, hotels/motels, and other commerical buildings, the distance from the domestic hot water supply source (water heater) to the point of use can be quite long. If the water in the piping system has cooled, the user may have to run the water for a long time in order to get hot water. This is inconventient and wastes both water and energy. Water is wasted because the cooled hot water in the pipes usually is discharged to the drain in order to get to hot water. Energy is wasted because the discharged water was heated previously by the hot water supply source.

In order to solve the problems of inconvenience and water waste, hot water recirculating systems are typically installed in larger residential structures and other commercial buildings. By continuously recirculating hot water around a loop, hot water is quickly available at the various points of use throughout the building. An electrically driven pump, typically installed at the end of the return line, draws hot water from the supply side of a hot water supply source and returns it to the cold water inlet of the hot water supply.

While this arrangement allows quick access to hot water and saves water, it is wasteful from an energy standpoint. Even when insulated, the loop and the piping connecting it to faucets and other points of use have a high heat loss. Most loops are uninsulated, and many of these are in unaccessible areas where it is not economically feasible to insulate them. Thus the heat loss from a continuously operating recirculation system can be quite high.

3. Description of the Prior Art

In order to solve the above problems, several systems are in use or have been proposed to turn off the recirculation pump at times. One commonly used method is to install a time clock which operates the recirculation pump during the day and turns the pump off at night. While this system will reduce heat loss at night, it has a severe drawback. This is because recirculation actually is needed most at night. During the day in an apartment building or motel/hotel, people often will use hot water at a number of fixtures throughout the building. This water draw keeps water in the distribution system hot and quickly available everywhere. However at night, very little hot water use usually occurs. If someone does use hot water, and if the recirculating pump is not running, the user may have to wait a long time for the hot water to arrive. In summary, regular hot water use in the day tends to keep water in the distribution system hot so that a recirculation system is needed less, but this is when the time clock runs the recirculation pump. At night, when the recirculation pump would be more useful, the time clock usually turns the pump off.

Another commonly used method is the use of an aquastat, a thermostatic control device for regulating water temperature. The aquastat is installed on the return water line and is set to turn off the pump when it senses that the return water temperature is above a preset point. This system saves very little energy over a system in which the recirculation pump runs continuously. The electrical energy savings are small because the pump motor is typically only a fractional-horsepower motor. The heat energy savings also are small, because while the pump may not operate as much, the distribution loop is still kept fairly hot at all times.

Three additional solutions have been proposed for this problem, however none are in widespread use, nor do any offer a fully practical solution.

Stevenson, in U.S. Pat. No. 4,201,518 (May 6, 1980) describes a manually operated system whereby potential users push a button when hot water is desired. This turns on a recirculation pump and then a timer runs the pump for a preset interval. There are two disadvantages to this system. First, the manual operation requires an extra step; one which is inconvenient and with which users are not familiar. Secondly, the cost of wiring a large buildings, or even small buildings, is prohibitively expensive.

Skaats, in U.S. Pat. No. 4,142,515 (Mar. 6, 1979), describes a system which turns on and off automatically by sensing the pressure in the hot water supply line. However, the system utilizes a pressure regulator on the cold water input line which keeps the line pressure continuously below the lowest level usually supplied by the main cold water supply source. The disadvantages of this system are: (1) the pressure regulator reduces supply system water pressure—this is a severe problem in areas of low water pressure; (2) the cold water pressure regulator is expensive to manufacture and install; (3) the system is not sensitive to low flow rates, e.g., when only one person uses a sink faucet at night; and (4) the system will go through a full cycle and totally heat up the distribution system even if it detects only a brief hot water call.

Lugan, Jr., in U.S. Pat. No. 4,606,325 (Aug. 19, 1986), describes a system primarily designed to save water. This system utilizes a recirculating pump to return unused hot water back to a holding tank rather than allowing it to cool off in the distribution piping. The system is activated by a variety of controls. The disadvantages of this system for the purposes under consideration here are that the system does not automatically sense water usage and that continuous operation of the recirculating pump in some control modes wastes energy.

OBJECTS AND ADVANTAGES

Accordingly one object of the invention is to provide an improved, energy saving hot water recirculation system. Another object is to conserve energy while not sacrificing the convenience and water savings of a hot water recirculating system.

Further objects are to provide a hot water recirculation system which prevents false signals due to leakage in the system, which is not activated by very short usages, which circulates water quickly to intermittent users, which does not activate if the distribution system is already hot, and which monitors for leakage or sensor problems in the system.

Still further objects and advantages will become apparent from a consideration of the following detailed description and accompanying drawings.

LIST OF REFERENCE NUMERALS

10 Cold water main
11 Tee in cold water main 10 to makeup cold water supply pipe 12
12 Makeup cold water supply pipe
13 Check valve
15 Water heater
16 Inlet to water heater
17 Outlet from water heater
18 Hot water distribution piping system
20 Kitchen sink
21 Bathroom faucet
22 Bathtub
24 Return pipe
25 Tee connection for recirculation return
26 Recirculation pump
27 Check valve
28 Isolation valve
29 Isolation valve
30 Wires from building's electrical service
33 Flow sensor
34 Controller
35 Switched power wires
36 Sensor wires
40 Flapper valve
41 Opening in sensor body
42 Magnet
43 Magnetic contact switch
44 Metal bar in 43
45 Return spring in 43
46 Normally open contacts in 43
48 Bypass conduit
49 Bypass conduit adjustment valve
51R Butterfly valve plate- right
51L Butterfly valve plate- left
52R Stem to 51R
52L Stem to 52L
53 Valve Seat
54 Sensor mechanism
55 Water tight cap
57R Right gear
57L Left gear
58 Gear
59 Gear
61 Mechanism arm
62 Return spring
63 Microswitch
64 Plunger to 63
67 Isolation valve
68 Isolation valve
69 Valve
71 Tee
72 Tee
80 Transformer
81 Relay
83 Control circuitry
84 Control circuitry
85 Control circuitry
86 Control circuitry
87 Aquastat
88 Occupancy sensor
90 Leakage warning detector
91 Warning signal

SUMMARY

In accordance with the present invention I provide a hot water recirculation system in which a sensitive flow sensor is installed in the makeup cold water line to the water heater. Ideally the flow sensor should be able to detect water use from as little as one faucet or tap. When the flow/usage sensor detects usage, a controller turns on the recirculating pump. When the sensor does not detect usage, the controller turns off the recirculating pump. The main components of the invention are a flow or usage sensor (sensor) on the makeup cold water supply pipe, and a controller for the recirculation pump.

Additional components are incorporated into the sensor or added into the controller to implement the optional enhancements to the basic operation of the system. These include: fluid bypass, signal conditioning, or sensor adjustment to prevent false signals due to leakage in the system; a timer to delay turn-on of the pump to avoid activation by very short usages; a timer or temperature sensor to delay turn-off of the pump until the loop is completely hot in order to circulate water more quickly to intermittent users; an optional aquastat to sense the temperature of the return water and to turn off or prevent the activation of the pump if the distribution system is already hot; and/or an alarm or monitor to detect leakage or sensor problems in the system.

By only running the recirculation pump when needed, significant energy can be conserved.

Figure 1:
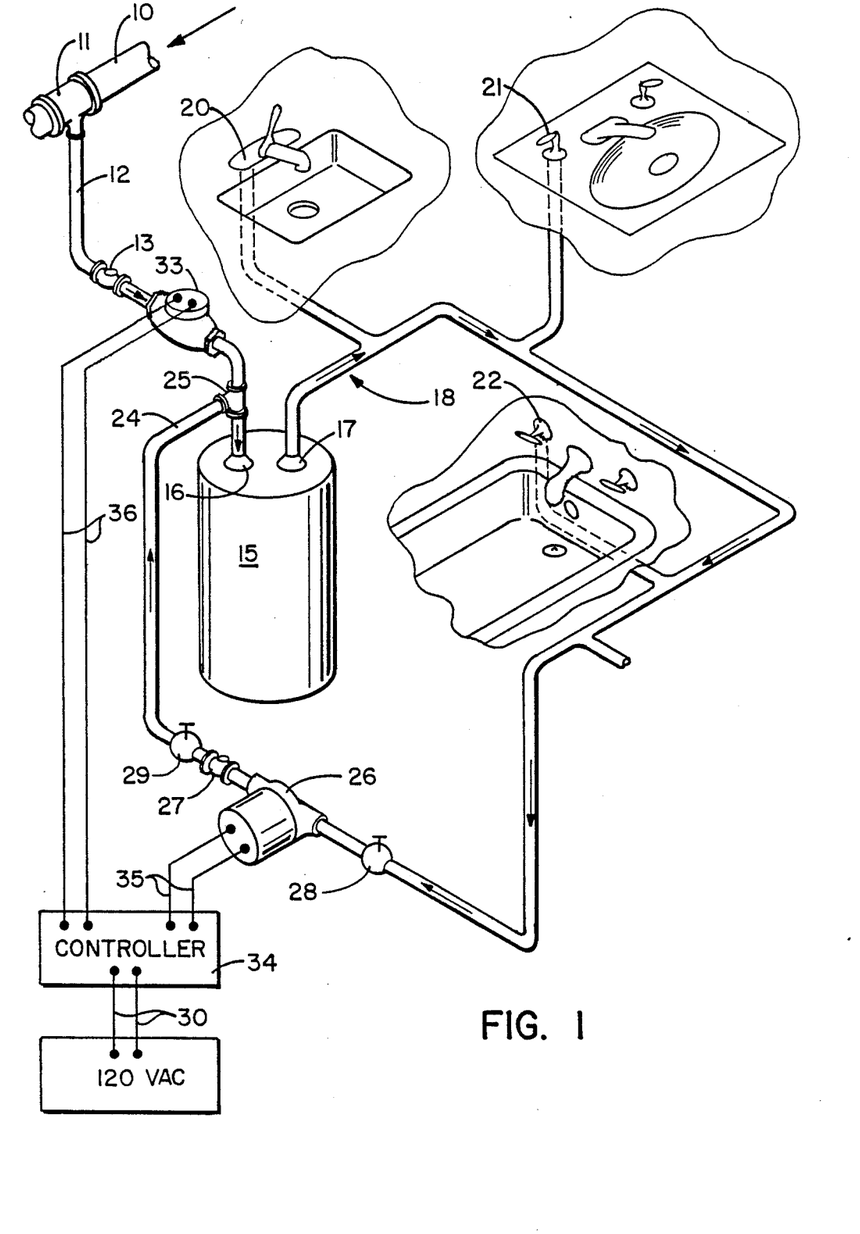
FIG. 1 is a diagrammatic representation of a hot water distribution system embodying the present invention.

FIG. 1: Recirculating Hot Water System According to Invention

FIG. 1 is a diagrammatic representation of a recirculating hot water system in an apartment building, hotel/motel, or other similar building to which has been added a usage-responsive hot water recirculation system according to a basic embodiment of the invention. A pressurized cold water supply main 10 supplies cold water to the system by a tee connection 11 from main 10 to a makeup cold water supply pipe 12 which feeds a water heater 15. A check valve 13 is generally installed on cold water supply pipe 12 to prevent back flow of hot water into the cold water supply system. A flow sensor 33, described below in more detail, is also installed in pipe 12.

Hot water heater 15 has an inlet 16 and an outlet 17. In FIG. 1 heater 15 is a conventional tank type heater. Any of a variety of water heating systems can be utilized, including but not limited to, a separate heater with a holding tank, a water heating coil in a space heating boiler with a hot water storage tank, or an instantaneous heater that heats water as it is being used and does not employ a holding tank. As hot water is needed, it is drawn through outlet 17 and into a hot water distribution piping system 18. Piping 18 is connected to a plurality of usage stations (outlets, taps, or faucets) which have been pictorially represented as including a kitchen sink faucet 20, a bathroom faucet 21, and a bathtub 22. Usage stations 20, 21, and 22 are remote from heater 15. The distance varies from those stations located in close rooms or apartments to those located long horizontal distances and several floors away. Although only three usage stations are illustrated, a typical apartment building, hotel/motel or commercial building will have several stations per bathroom and at least one per kitchen. In a large apartment building there would be several hundred usage stations.

In a nonrecirculating hot water systems the last supply pipe (the one most distant from heater 15) simply terminates at the last faucet or tap on the line. However in a recirculating system, a return pipe 24 is provided to recirculate water back to a tee connection 25 in cold water supply pipe 12. The recirculated water is mixed with makeup cold water as needed and is reheated in heater 15. Typically a recirculating pump 26 is located in return line 24. A check valve 27 is installed to prevent back flow when the pump is not operating, and a set of isolation valves are installed to promote ease of servicing; valve 28 is upstream and valve 29 is downstream of the pump. Isolation valves are valves used to separate a major piece of equipment from a piping system in order to facilitate maintenance and repair.

Whenever one or several hot water taps are used, hot water flows from the system through piping 18 and is replaced by an equal flow of cold water into the system from pipe 12. If no hot water is being used, there is no flow of cold water into the system. Because flow sensor 33 is located on pipe 12 before tee connection 25 for recirculation return, flow sensor 33 detects makeup cold water flow into the system, but not flow due to recirculation. A pair of sensor wires 36 connects sensor 33 to a controller 34 Controller 34 is shown separate, but can be attached to flow sensor 33, pump 26, or even divided among several locations.

Power to controller 34 is supplied through a pair of wires from the building's electrical service 30. Controller 34 provides switching control of the power. A pair of switched power wires 35 then connect the power to recirculation pump 26. In the most basic embodiment, controller 34 turns on pump 26 whenever flow is sensed by flow sensor 33 in pipe 12. Enhancements to the basic design are available to prevent false activation due to system leakage, to prevent activation on very short usages, to turn off or prevent the activation of the system if the distribution system is already hot, to run the pump for a preset minimum time, and/or to monitor leakage or sensor problems in the system.

Methods to Detect Flow or Usage of Hot Water by Flow Sensor 33

Flow sensor 33 may utilize one or more of a variety of flow sensor mechanisms. A mechanical member, such as a plate, valve, sail, or flag, can be positioned in the piping such that it is moved by flowing water. Movement of the member can be detected in a variety of ways which include operation of a mechanical switch, operation of a magnetic contact switch, detection by optical means, and other appropriate methods.

Fluid flow can also be detected by a change of the fluid's pressure due to fluid flow. This method includes such mechanisms as detection of pressure drop from flow through an orifice plate, detection of pressure drop from flow through an a converging/diverging nozzle, detection of velocity head with a Pitot tube, detection of pressure drop across a check valve (the pressure tap can be either integral with or separate from the check valve), and detection of pressure difference between an unregulated cold water supply inlet and a hot water supply outlet. This method of flow detection does not include the use of a pressure regulated cold water supply as in the above Skaats patent. Skaats detects fluid flow by sensing the drop in pressure of the outlet hot water line on a system with a pressure regulated cold water inlet. The disadvantages of this system have already been discussed.

Alternately, a paddle wheel, pump blade, or other airfoil shaped surface can be positioned within the piping such that water flow causes the device to rotate and the rotational movement is then detected. Also, sound waves can be bounced off of entrained elements in the water and the fluid flow can be detected by doppler effect. Further, a hot wire anemometer can be used to detect fluid motion.

The flow sensor can send either an analog or a digital signal. An analog signal is proportional to the flow rate. Analog sensors are not as commercially viable as the digital on/off sensors because of the added complexity of conditioning the analog signal. Since it doesn't matter whether use is large or small, a simple digital 'use' or 'no use' signal is sufficient for control and is preferable due to its ease of manufacture and lower cost.

The use of fluid pressure differences due to detect flow has the advantage that it can be implemented with a small pressure drop. However, it has the disadvantage that the pressure differences in a large supply pipe during low flow conditions are quite small. Sensors to detect these small pressure differentials are expensive. The most practical embodiment for a sensor is any number of designs involving the movement of a mechanical valve or plate operating a on/off switch. Two of these designs are detailed hereinafter in FIGS. 3-6.

Methods to Prevent False Signals Due to Leakage in the System

In any large facility such as an apartment building, motel/hotel, or commercial facility, there will be some hot water leakage from the distribution system due to various leaks such as dripping faucets, etc. A problem would occur if the sensor signals this leakage as water usage and the controller needlessly operates the recirculation pump. For optimal performance the flow sensor should detect very low flow rates, for instance when only one person is washing his or her hands in the middle of the night. The flow rate of such a use could be as low as 2-4 liters per minute (1 pm). On a large system the combined leakage rate from the plurality of hot water usage points could be 20-40 1 pm. Therefore a very sensitive control system might turn the recirculation pump on in error by signalling leakage flow as water usage.

Several methods to prevent this are described below. They employ both fixed and adjustable means to pass certain amounts of flow before the sensor indicates usage is in progress.

A non-adjustable form of leakage bypass can be obtained by providing large enough tolerances for the sensor parts that a certain amount of water can pass through without activating the sensor. The leakage of the system is balanced by the leakage of the sensor.

Figure 2:
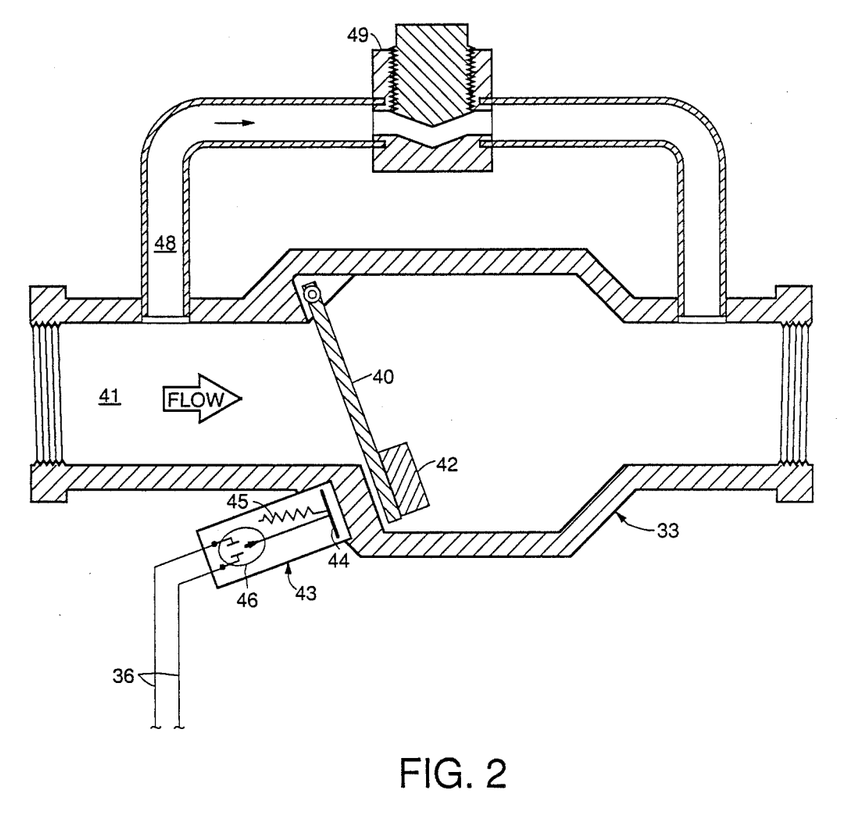
FIG. 2 is a view of a preferred embodiment of a flow sensor used in the system of FIG. 1.
Figure 5A:
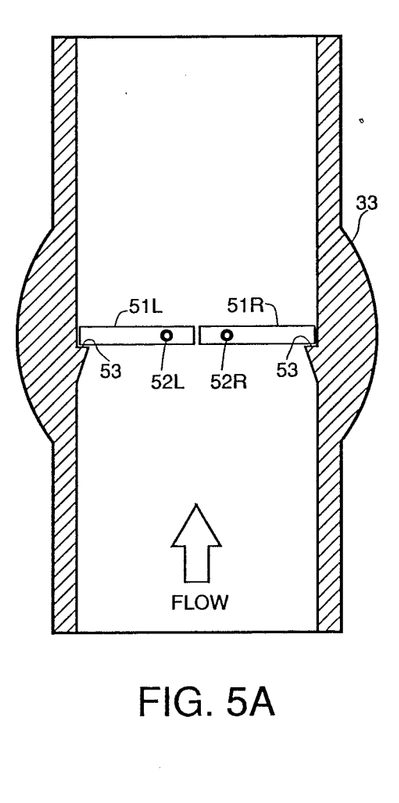
FIG. 5A to 5C show an embodiment of a leakage bypass adjustment used in the embodiment of FIG. 4.
Figure 5B:
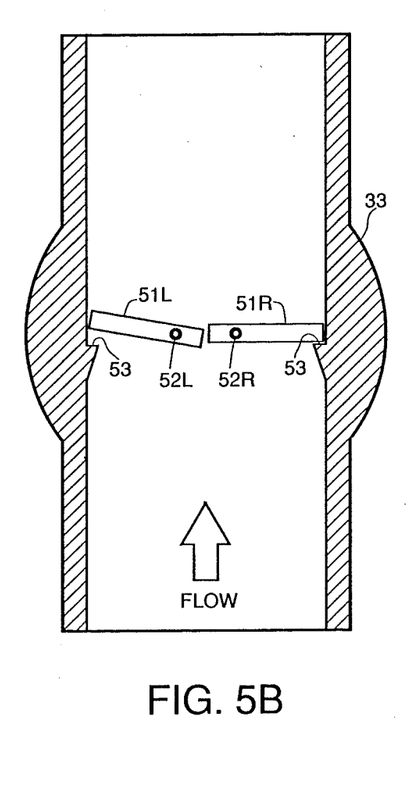
Figure 6:
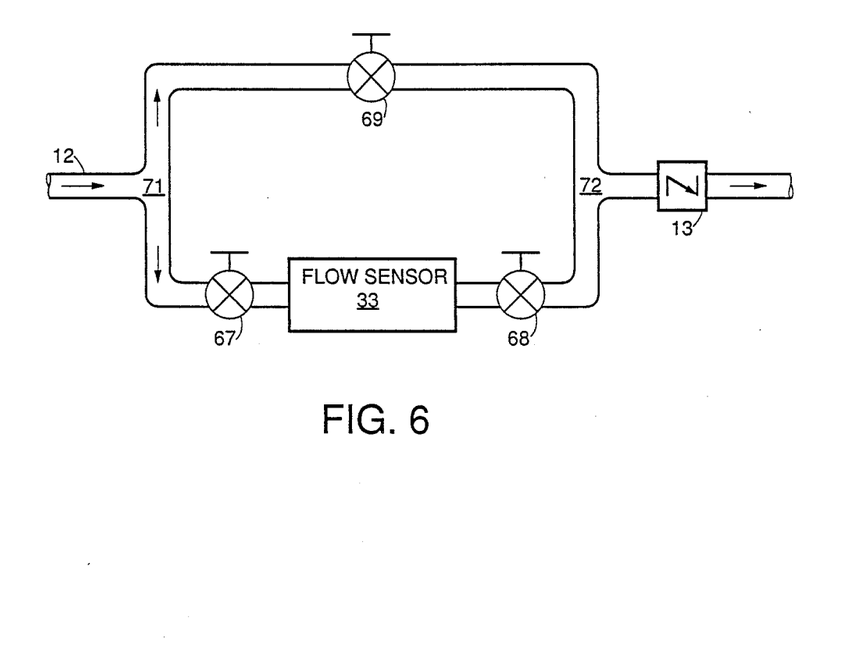
FIG. 6 is a view of an embodiment of a leakage bypass adjustment wherein the bypass is incorporated into a piping arrangement to isolate and service the flow sensor.

Because of the varying leakage rates in different buildings, adjustable devices are preferable. One adjustable bypass control employs a bypass conduit with an adjustable valve. By adjusting the valve in the bypass conduit, the amount of flow necessary to cause the sensor to register use can be adjusted. This is illustrated in FIG. 2. FIG. 6 illustrates a leakage bypass adjustment wherein the bypass is incorporated with a piping arrangement to isolate and service the flow sensor. Another leakage bypass control uses an adjustable opening within the sensor mechanism itself, as shown in FIGS. 5A to 5B.

With analog signals the controller can be designed to operate the pump only when the signal strength indicates that the flow rate is greater than the leakage rate.

FIG. 2: Flapper Valve Flow Sensor

FIG. 2 illustrates an embodiment of the flow sensor 33 where a flapper valve 40 seals an opening 41 through which water must pass to flow through sensor 33. The body of flow sensor 33 and flapper valve 40 are made of brass or another suitable non-corrosive, non-magnetic material. A magnet 42 is located on the end of flapper valve 40, suitably coated to prevent corrosion. On the body of flow sensor 33 are the other elements of a magnetic contact switch 43, similar to those commonly found as door contacts in burglar alarm systems. The magnet holds onto a metal bar 44 in contact switch 43 with a certain amount of force. This force compresses a spring 45 and opens a set of normally closed electrical contacts 46 which are connected to sensor wires 36.

At very low flow rates, all of the fluid bypasses flapper valve 40 via a bypass conduit 48. The flow rate in bypass conduit 48 can be adjusted by a valve 49. At higher flow rates flapper valve 40 is forced open. Magnet 42 swings away from magnetic contact switch 43 causing contacts 46 to close. Sensor wires 36 carry this signal to controller 34 (FIG. 1) which turns on pump 26.

Figure 3:
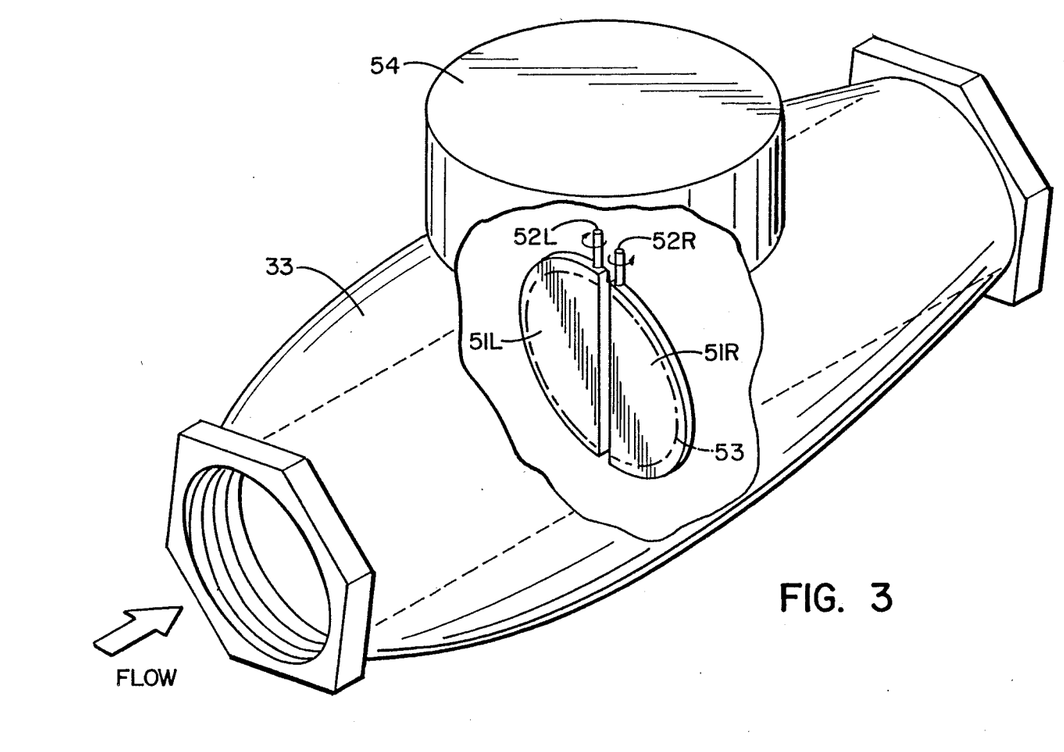
FIG. 3 is a view of another flow sensor which can be used in the system of FIG. 1.

FIG. 3: Butterfly Valve Flow Sensor Embodiment

FIG. 3 illustrates an embodiment of flow sensor 33 where flow is detected by the movement of a set of butterfly valve plates 51R and 51L. When closed, plates 51 seal a valve seat 53 and block the flow of fluid. When fluid flow occurs, the valve plates are forced open, causing two valve stems 52R and 52L to rotate. This causes a detectable motion in a sensor mechanism 54 shown in FIG. 4.

Figure 4:
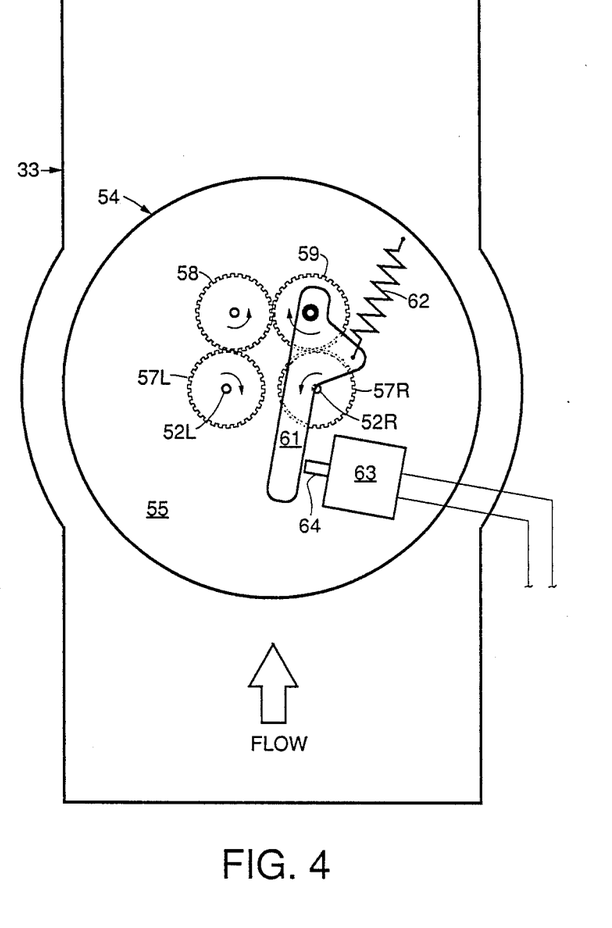
FIG. 4 details an embodiment of a gear and switch arrangement used in the embodiment of FIG. 3.

FIG. 4: Sensor Mechanism

FIG. 4 illustrates one suitable embodiment of sensor mechanism 54 to the flow sensor embodiment presented in FIG. 3. The stems 52 from butterfly valve plates 51 pass through a watertight cap 55. Gears are attached rigidly onto the top of the stems of the butterfly valve blades, specifically a right gear 57R is attached to a right stem 52R, and a left gear 57L is attached to a left stem 52L. A gear 58 engages gears 57L and 59. A gear 59 engages gears 57R and 58.

A mechanism arm 61 is also attached to stem 52R above gear 59. A return spring 62 is attached to arm 61 and returns the butterfly valve blades 51 to the closed position when there is no fluid flow. In the valve's closed position, arm 61 presses on a microswitch plunger 64 which opens the normally closed contacts (not shown) of a microswitch 63. Fluid flow causes arm 61 to rotate away from plunger 64 and the microswitch contacts close. This signal is carried on sensor wires 36 to controller 34 (FIG. 1).

Gear 58 is mounted such that it can be lifted and moved relative to gears 57L and 59. The angle of the butterfly valve blades 51R and 51L can thus be adjusted as will be discussed hereinafter in FIG. 5. The same functions could be achieved using only two gears instead of four, thereby using fewer but more complicated parts.

Figure 5C:
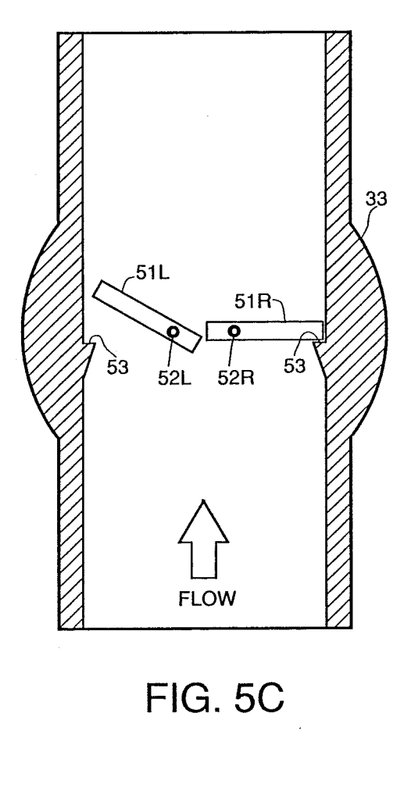

FIG. 5A-5C: Adjustable Mechanism for Leakage Bypass

FIGS. 5A-5C illustrate the gear position adjustment such that a set amount of opening is allowed for leakage bypass while the flow sensor is still signalling "no flow". In each case blade 51R is closed onto valve seat 53 by the action of spring 62 (FIG. 4) which opens microswitch 63 (FIG. 4).

FIG. 5A illustrates the completely closed position whereby almost no leakage is allowed before a flow signal is originated.

FIG. 5B illustrates an intermediate position. Adjustable valve blade 51L has been repositioned such that it no longer seals tightly on valve seat 53. The resulting gap allows a given leakage flow to pass without activating the control circuit.

FIG. 5C illustrates valve blade 51L in a fairly wide open position to allow large leakage flows before a signal is generated by flow sensor 33.

FIG. 6: Leakage Bypass Incorporated into of the Flow Sensor Installation

FIG. 6 is a diagrammatic view of a preferred embodiment of the installation of flow sensor 33 into makeup cold water supply pipe 12. A leakage bypass adjustment valve 69 is integrated with an apparatus for isolating the flow sensor for service and repair while still maintaining water supply. Pipe 12 splits into two at a tee 71. Flow sensor 33 is installed in one side with an isolation valve 67 before and isolation valve 68 after. Valve 69 is installed on the other side and is used for leakage bypass control. The two sides rejoin at a tee 72 and pass through check valve 13. If flow sensor 33 needs servicing, valve 69 is opened fully and isolation valves 67 and 68 are closed. Thus the sensor can be removed without interrupting the water supply.

Figure 7:
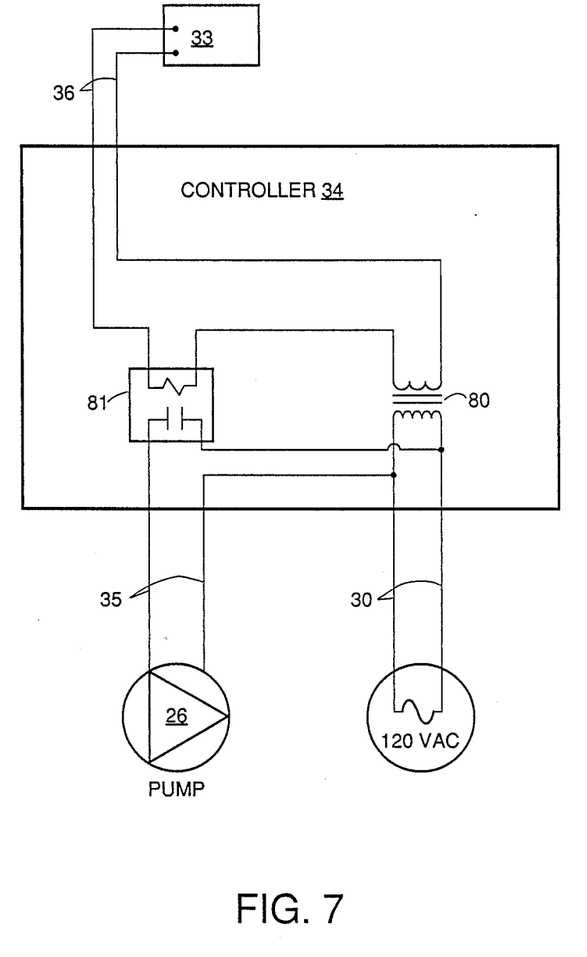
FIG. 7 illustrates a diagrammatic view of a basic embodiment of a controller which is used in FIG. 1.

FIG. 7: Controller 34

FIG. 7 illustrates a basic embodiment of controller 34. Controller 34 turns on and off recirculating pump 26 by switching the pump's current supply, typically the 120-volt building electrical service 30. A transformer 80 and a relay 81 are located inside controller 34. Flow sensor 33 sends a signal to controller 34 by closing the circuit through sensor wires 36, thereby energizing relay 81 and sending power to pump 26 through wires 35.

Figure 8:
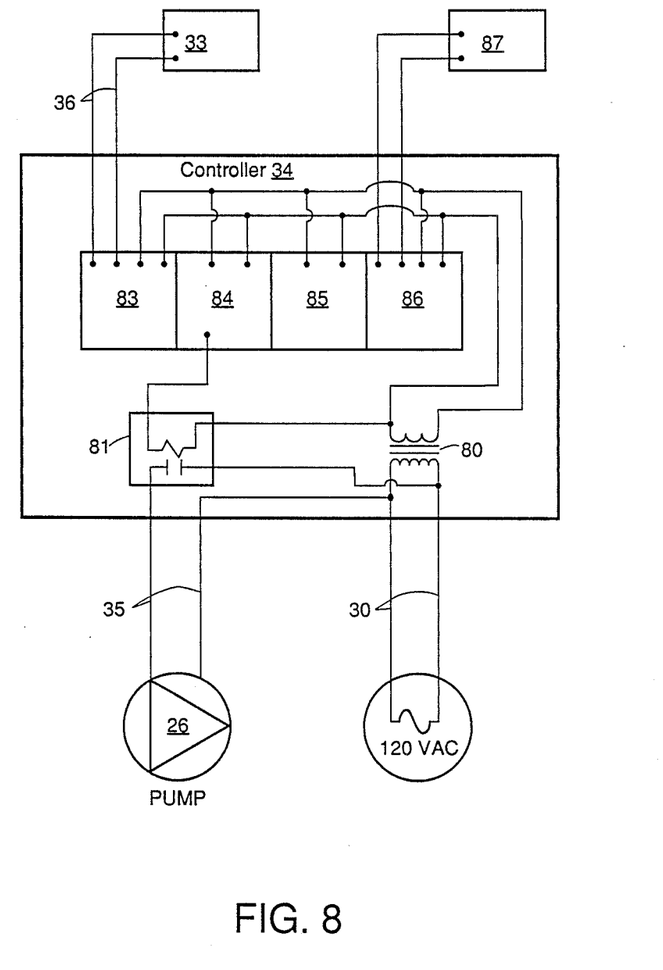
FIG. 8 illustrates a diagrammatic view of a controller with several optional enhancements which can be used in the system of FIG. 1.

FIG. 8: Enhancements to the Basic Controller

Several optional enhancements are possible to improve the operation of the controller. These enhancements include control circuitry to prevent activation on very short usages 84, control circuitry to turn off or prevent the activation of the system if the distribution system is already hot 86, control circuitry to run the pump for a preset minimum time 85, and/or control circuitry to monitor leakage or sensor problems in the system 83. A variety of control arrangements are possible to accomplish these results. These enhancements can be incorporated signally or in combination.

Delayed Turn-On of Recirculation Pump

In an apartment building, motel/hotel, or commerical building, users may only need a small amount of water for a short time. For instance, a user might turn on hot water for one second to fill an empty used coffee cup with water so that it does not dry out and is easier to clean the next day. The only water the user will get is the water standing in the pipes which lead to the faucet. No hot water would be delivered, even with a continuously operating recirculation system. Also no hot water would actually be needed, since cold water will do, but people tend to use hot water. However, if the system described detects hot water use, the pump will start. If the system has a timed-based or thermostatic off-delay, the whole system will fill with hot water, which will waste a considerable amount of energy. On the other hand, if the system does not have an off delay mechanism and if there is much intermittent use, the pump will experience many short on/off cycles which will be hard on the pump. To eliminate these problems, it is desirable to incorporate a delay circuit into the controller. Then the controller will turn the pump on only if water usage lasts for longer than a certain time, perhaps 3 seconds.

A further enhancement is to set the controller to accumulate short uses and to activate the pump after several small uses in a short period of time. For instance, the controller starts the pump if water is used 5 seconds out of a 15 second period. Thus if a user has a longer term intermittent need, such as doing a moderate stack of dishes, hot water will soon be delivered. The exact delay time could be fixed or adjustable to the particular circumstances of the installation. Various control circuits 84 are available for doing this.

Delayed Turn-off of Recirculation Pump

Numerous activities call for repeated use of small amounts of hot water, such as shaving, washing clothes by hand, or washing dishes. If the controller responded to each of these uses, it would rapidly turn the pump on and off. Such short cycling is hard on pumps. Therefore once such hot water use is sensed, it is best that the recirculating pump continue to operate until the entire recirculation loop is hot. Control circuitry 85 can use measurement of time or temperature to achieve a delayed turn-off function. With the timer based method, a timer in the controller holds the recirculation pump on for the amount of time required to completely flush the distribution system of the cooled hot water standing in it. The temperature based method uses an aquastat and is illustrated in FIG. 9.

Figure 9:
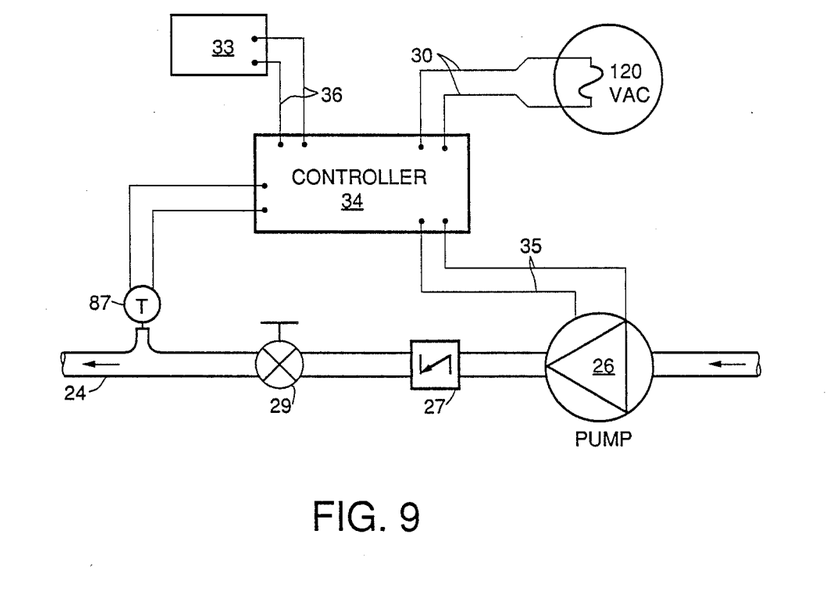
FIG. 9 is a view of an optional aquastat which can be used in the system of FIG. 1.

FIG. 9: Aquastat

An aquastat is a thermostat used for controlling water temperature. In FIG. 9 an aquastat 87 is installed in return pipe 24 and connected to controller 34. Aquastat 87 senses the temperature of the return water and control circuitry 86 turns off pump 26 after the temperature rises above a preset level. The advantage of the temperature method is that when the distribution loop is already hot, control circuitry 86 keeps the pump off even while water use is in progress.

Monitoring of Leakage and Sensor Problems

Another controller enhancement is monitoring circuitry 83 which sends an alarm or warning signal if the flow sensor does not send a 'no-flow' signal over an extended period of time, typically 24 hours.

During any given day there will be times when no hot water is in use. Typically this occurs late at night and very early in the morning. If the flow detector does not detect zero flow at any time during a 24-hour period, it is very unlikely that hot water has been used continuously. More likely either the flow sensor is malfunctioning or the leakage rate is now higher than the bypass setting. In either case service is required.

The warning signal might indicate that the flow sensor is stuck in the 'on' position. Such a sensor would run the pump continuously and cause energy waste. A further enhancement of this idea is to also have a warning if the flow sensor has indicated no flow for 24 hours. This indicates that the flow sensor is malfunctioning in the 'off' position.

If the leakage rate increases over the original bypass setting, the flow sensor would again send a continuous 'flow' signal. The warning indicator would thus indicate the increased energy and water waste due to leakage and provide a warning that corrective action is needed.

If a manual reset button is incorporated, the warning signal will stay activated until reset.

FURTHER RAMIFICATIONS

Figure 10:
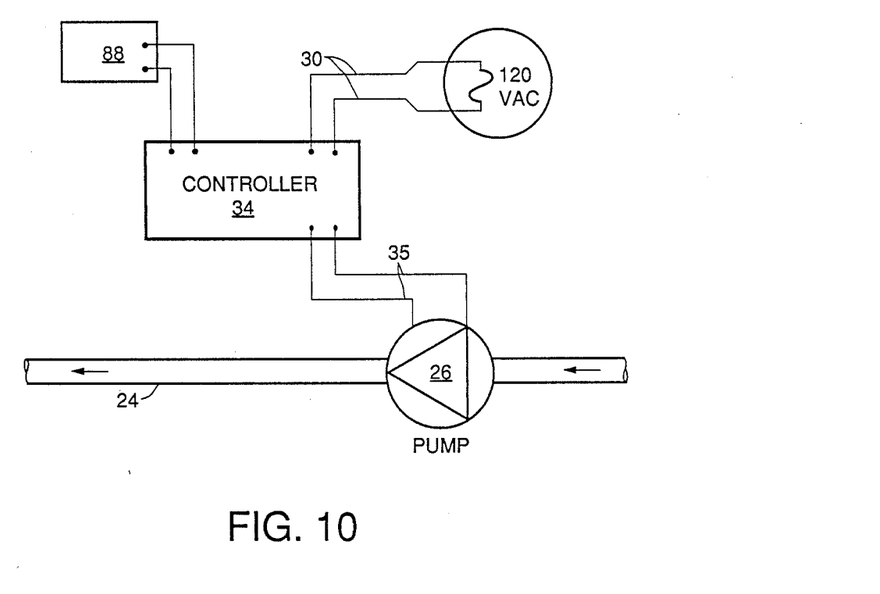
FIG. 10 illustrates the use of an occupancy sensor to detect the need for recirculation.

FIG. 10: Occupancy Sensor

FIG. 10 illustrates a further ramification of the usage detection system, specifically an alternative system whereby usage is assumed under certain circumstances such as occupancy. An occupancy sensor 88 is substituted for flow sensor 33 such that controller 34 is activated whenever potential users are in the vicinity of the hot water usage points.

Figure 11:
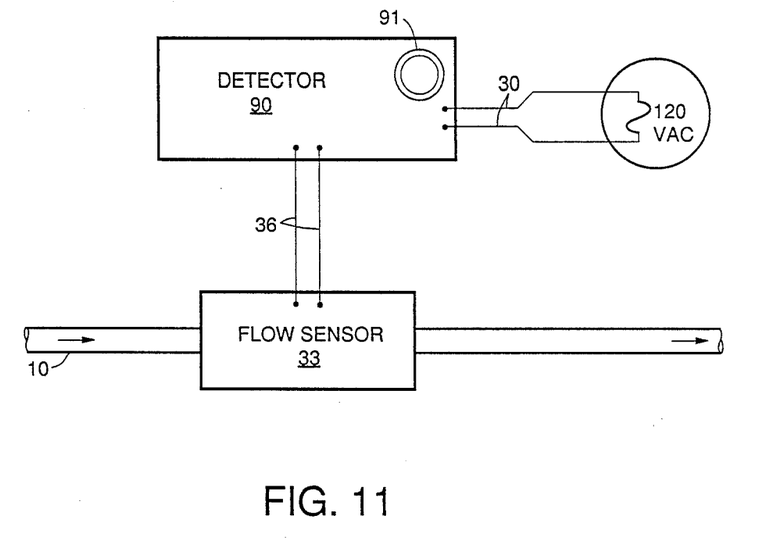
FIG. 11 illustrates the use of the flow sensor with a leak detector.

FIG. 11: Leakage Warning Detector

FIG. 11 illustrates a further ramification of the leakage warning indicator. Flow sensor 33 is installed on cold water supply line 10 to the cold water outlets and taps. A leakage warning detector 90 contains monitoring circuitry which activates an alarm or warning signal 91 if the flow sensor does not send a 'no-flow' signal over an extended period of time, typically 24 hours. The leakage warning can thus be extended to the cold water side. A warning is thus generated if such common conditions as continuously running toilets or bad faucet washers exist.

SUMMARY, RAMIFICATIONS, AND SCOPE

The reader will thus see that I have provided a device for controlling a hot water recirculation system which operates the recirculating pump only when needed. This device saves energy without sacrificing the convenience and water-saving characteristics of the recirculating system. The device is also simple to manufacture, easy to install and cost effective.

The commonly used time clock control does not provide recirculation at the times when it is most needed. The use on an aquastat alone does not provide significant energy savings. The system described earlier by Stevenson is too complex, unfamiliar and too expensive. The system in Skaats' patent is usage responsive but is insensitive, lowers water pressure, is expensive, and is inefficient. The system designed by Lugan is primarily designed to save water, not energy.

Further enhancements to the basic device have been illustrated and discussed which include fluid bypass, signal conditioning, or sensor adjustment to prevent false signals due to leakage in the system; a timer to delay turn on of the pump to avoid activation by very short usages; a timer or temperature sensor to delay turn off the pump until the loop is completely hot in order to circulate water more quickly to intermittent users; an optional aquastat to sense the temperature of the return water and to turn off or prevent the activation of the pump if the distribution system is already hot; and/or an alarm or monitor to detect leakage or sensor problems in the system.

While certain specific embodiments, parts, and connections have been shown, various additional ramifications can be provided such as replacing the flow sensor with an occupancy sensor to detect the presence of potential users of hot water in the vicinity of the hot water usage points. The recirculation pump will then operate whenever potential users approach.

A further ramification of the usage responsive recirculation system is the use of the system to control the recirculation of conditioned fluids other than heated domestic water. The fluid conditioning can be any of a variety of activities such as heating a fluid, cooling a fluid, or adding a solute to a fluid.

Therefore the scope of the invention should be determined, not by the embodiments illustrated and discussed, but only by the appended claims and their legal equivalents.

I claim:
1. In a hot water distribution system including:
   means for supplying hot water, said means having an inlet and a hot water outlet,
   a hot water distribution supply pipe, said hot water distribution supply pipe being connected to said hot water outlet,
   a plurality of hot water lines,
   a plurality of hot water usage stations, said hot water usage stations being connected to said hot water distribution supply pipe via said hot water lines,
   a makeup water supply pipe, said makeup water supply being connected to said inlet and being connected to a main water supply pipe which supplies unheated water to said system from a main external source of supply,
   a return pipe, said return pipe being connected to said makeup cold water supply pipe to form a loop between said inlet and said hot water outlet of said means for supplying hot water, and
   means for recirculating hot water around said loop from said outlet to said inlet of said means for supplying hot water,
   the improvement comprising:
   flow detection means in said makeup water supply pipe for detecting usage of hot water at any of said hot water usage point by the flow of unheated makeup water into the system from said main external source of supply, and for providing an output signal in response to detection of such usage, and
   control means for operating said recirculation pump in response to said output signal.

2. The system of claim 1, further including bypass means for causing said flow detection means to provide said output signal at a higher flow rate than without said bypass means.

3. The system of claim 2, wherein said bypass means is adjustable so that it will not provide said output signal when system water use is below a preset level.

4. The improvement of claim 1, further including delay means for preventing said control means from starting said recirculation means until said output signal is detected by said control means for a preset period of time.

5. The system of claim 4 wherein said delay means is adjustable.

6. The system of claim 4 wherein said delay means accumulates said output signals and triggers said control means to start operation of said recirculating means only if the amount of said signal received over a period of approximately fifteen seconds is sufficient to indicate consistent intermittent usage.

7. The system of claim 1, further including time delay means for preventing said control means from shutting off said recirculation means for a preset time sufficient to allow the recirculating water to fill said hot water distribution supply pipe, and for preventing short cycling of said recirculating means under intermittent draw conditions.

8. The system of claim 1, further including delay means for preventing said control means from shutting off said recirculating means until a preset temperature has been reached in said recirculation loop.

9. The system of claim 1, further including temperature detection means for turning off said recirculating means and preventing said recirculating means from operating when said hot water distribution system is full of hot water.

10. The system of claim 1, further including occupancy sensing means for providing an output signal to said controller and activating said recirculation means when potential users of hot water are detected in the vicinity of said hot water usage stations.

11. The system of claim 1, further including bypass means for enabling said flow detection means to be selectively bypassed so that said flow detection means can be repaired or replaced.

12. The system of claim 1 wherein said recirculation means is an electric pump.

13. In a conditioned fluid distribution system including:
   means for supplying conditioned fluid, said means having an inlet and a conditioned fluid outlet,
   said fluid conditioning being selected from the class of heating, cooling, and adding a solute to said fluid,
   a conditioned fluid distribution supply pipe, said conditioned fluid supply pipe being connected to said conditioned fluid outlet,
   a plurality of conditioned fluid lines, a plurality of conditioned fluid usage stations, said conditioned fluid usage stations being connected to said conditioned fluid supply pipe via said conditioned fluid lines, a makeup fluid supply pipe, said makeup fluid supply pipe being connected to said inlet and being connected to a main unconditioned fluid supply pipe which supplies unconditioned fluid to said system from an external source of supply, a return pipe, said return pipe being connected to said makeup conditioned fluid supply pipe to form a recirculation loop between said inlet and said conditioned fluid outlet of said conditioned fluid supply means, means for recirculating conditioned fluid around said recirculation loop from said outlet to said inlet of said means for supplying conditioned fluid, the improvement comprising:

flow detection means in said unconditioned makeup fluid supply pipe for detecting usage of said conditioned fluid at any of said conditioned fluid usage stations by the flow of unconditioned makeup fluid into said system from said main external source of supply, and providing an output signal in response to detection of such usage, and control means for operating said recirculation means in response to said output signal.

14. The system of claim 13, further including bypass means for causing said flow detection means to provide said output signal at a higher flow rate than without said bypass means.

15. The system of claim 13, further including delay means for preventing said control means from starting said recirculation means until said output signal is detected by said control means for a preset period of time.

16. The system of claim 13, further including time delay means for preventing said control means from shutting off said recirculation means for a preset time sufficient to allow the recirculating fluid to fill said distribution supply pipe and preventing short cycling of said recirculating means under intermittent draw conditions.

17. In a water supply system including:

means for supplying water, a water distribution system, said means for supplying water being connected to said water distribution system, a plurality of water usage lines, said water distribution system being connected to said plurality of water usage lines, a plurality of water usage stations, said means for supplying water being connected to said plurality of water usage stations via said water distribution system and via said water usage lines, the improvement comprising:

flow detection means in said water supply means for detecting water usage, and providing an output signal in response to detection of such usage, and analyzer means for providing a warning when flow is detected continuously during a twenty four hour period of time thereby indicating that leakage problems are occurring in said system.

18. The system of claim 17, further including bypass means for increasing the flow at which said flow detection means provides said output signal.

19. The system of claim 18 wherein said bypass means is adjustable so that said flow detection means will not provide said output signal in response to system water use below a predetermined level.

* * * * *